United States Patent
Lee et al.

(10) Patent No.: US 7,440,775 B2
(45) Date of Patent: Oct. 21, 2008

(54) METHOD FOR CONTROLLING PRINTER USING PORTABLE TERMINAL FOR MOBILE COMMUNICATION IN HOME NETWORK SYSTEM

(75) Inventors: Yoon-Sun Lee, Seoul (KR); Ki-Ho Jung, Gwacheon-si (KR); Jae-Yeon Song, Seoul (KR); Eun-Taek Lim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 86 days.

(21) Appl. No.: 11/115,195

(22) Filed: Apr. 27, 2005

(65) Prior Publication Data

US 2005/0272469 A1    Dec. 8, 2005

(30) Foreign Application Priority Data

Jun. 4, 2004    (KR) ................. 10-2004-0040938

(51) Int. Cl.
*H04Q 7/20* (2006.01)

(52) U.S. Cl. .................. 455/557; 455/426.2
(58) Field of Classification Search .............. 455/420, 455/419, 418, 151.4, 123, 161.2, 405, 551, 455/557, 88, 426.2, 411; 709/217, 206; 358/1.15
See application file for complete search history.

(56) References Cited

U.S. PATENT DOCUMENTS 6,243,574 B1 * 6/2001 McGregor et al. .......... 455/418
6,779,004 B1   8/2004 Zintel
2001/0019953 A1 * 9/2001 Furukawa et al. ........... 455/420
2001/0034774 A1 * 10/2001 Watanabe et al. ........... 709/217
2002/0034940 A1 * 3/2002 Takae et al. ................. 455/418

(Continued)

FOREIGN PATENT DOCUMENTS

EP    1349060    * 3/2004

(Continued)

OTHER PUBLICATIONS

A XILINX White Paper by Amit Dhir entitled *Home Networking Middleware*; WP136 (v1.0) Mar. 21, 2001.

(Continued)

*Primary Examiner*—Melody Mehrpour
(74) *Attorney, Agent, or Firm*—Robert E. Bushnell, Esq.

(57) ABSTRACT

A method for controlling a local printer connected to a PC (Personal Computer) using a portable terminal for mobile communication in a home network system. The method controls the printer serving as a local device not included in the home network system by means of the portable terminal for mobile communication serving as a home networking device. In the home network system including the portable terminal and the PC, the portable terminal is connected to the PC by means of home networking. Content within the PC is searched for and selected using the portable terminal. The portable terminal sends a print request message to the PC so that the local printer can print the selected content. In response to the print request message, the PC creates a print job and transfers the selected content to the local printer so that the local printer can print the transferred content. The portable terminal receives a result of the print job from the local printer through the PC.

15 Claims, 6 Drawing Sheets

U.S. PATENT DOCUMENTS

| | | | |
|---|---|---|---|
| 2003/0119485 A1* | 6/2003 | Ogasawara | 455/411 |
| 2003/0179406 A1* | 9/2003 | Seto | 358/1.15 |
| 2003/0181195 A1* | 9/2003 | Christiansen et al. | 455/414.1 |
| 2007/0104160 A1* | 5/2007 | Ho | 370/338 |

FOREIGN PATENT DOCUMENTS

| | | | |
|---|---|---|---|
| JP | 2002-183028 | * | 12/2000 |
| JP | 2001-105690 | | 4/2001 |
| JP | 2002-278870 | | 9/2002 |
| JP | 2002-323961 | | 11/2002 |
| JP | 2002-358188 | | 12/2002 |
| JP | 2002-369110 | | 12/2002 |
| JP | 2003-224893 | | 8/2003 |

OTHER PUBLICATIONS

Japanese Office action corresponding to Japanese Patent Application No. 2005-163392, issued on May 1, 2007.

* cited by examiner

METHOD FOR CONTROLLING PRINTER USING PORTABLE TERMINAL FOR MOBILE COMMUNICATION IN HOME NETWORK SYSTEM

PRIORITY

This application claims priority to an application entitled CONTROL METHOD OF PRINTER BY USING MOBILE PHONE IN HOME NETWORK SYSTEM, filed in the Korean Intellectual Property Office on 4 Jun. 2004 and assigned Serial No. 10-2004-0040938.

BACKGROUND OF THE INVENTION

1. Field of the Invention

The present invention relates to a method for controlling a local printer connected to a PC (Personal Computer) using a portable terminal for mobile communication in a home network system.

2. Description of the Related Art

Home networks are part of next generation Information Technology (IT) being greatly noticeable and comprised of an aggregate of technologies for maximizing the convenience of living by being coupled to the Internet in order to control, manage, integrate and interwork information home appliances in the home. Home network technology is divided into lower network technology for physical data transmission, middleware technology for interworking with a higher application, and information home appliance technology applied to each home appliance according to a technical layer. Currently, home networks are combined with broadband communication, wireless Internet, sensor technologies, etc. and hence are being extended to a ubiquitous computing network.

Research is currently under way into home network middleware serving as an interface between a lower network layer and an application layer for controlling and managing the information home appliances. Various types of home network middleware such as UPnP (Universal Plug and Play), Jini, OSGi (Open Service Gateway Initiative) and HAVi (Home Audio/Video Interoperability) have been developed. However, none of the home network middleware described above has gained technological predominance, such that various forms of home network middleware co-exist.

Here, a home network system is defined as a home network system using UPnP middleware. However, the present invention may be applied to the home network system using various types of home network middleware such as Jini, OSGi, and HAVi.

The home network system establishes an organic connection through networking between the devices in the home, such that the home network system can provide various services to the user.

A potable terminal for mobile communication is used as a control tool in the home network system. In modern society, portable terminals for mobile communication are necessities of life that the user carries at all times irrespective of places such as offices, homes, etc., and is becoming an important device in various networking fields because it performs various functions such as an Internet access function and an electronic payment function.

Recently, when the portable terminal for mobile communication is connected to AV (Audio/Video) equipment such as a TV (Television) set or audio equipment, it serves as the existing remote controller for controlling channel selection, recording and playback functions. Thus, portable terminals for mobile communication are developing into devices of an extended concept beyond simple mobile communication.

A control function of the portable terminal for mobile communication serving as the controller is currently limited to the AV equipment. When connected to an information device, for example, a PC (Personal Computer) or laptop computer, the portable terminal for mobile communication is used only for uploading or downloading content such as music or photos. A printer serves as a peripheral operating in a state in which it connects to the PC via a local network, but is not recognized as one of the devices configuring a home or office network system. For this reason, the portable terminal for mobile communication cannot currently control the printer.

When enabling a print job, the user is inconvenienced in that he or she must directly go to the location of the printer to determine whether or not the print job is finished, after sending a data output command to the printer. In particular, when a network state is bad or an amount of output is large, the user must directly go to the location of the printer and confirm completion of the print job. When printer output is stopped due to a jam error, the user must directly go to the location of the printer or make confirmation using the PC. These may serve as the limitations of convenience when the printer is used by means of the portable terminal for mobile communication that performs a control operation irrespective of a place.

SUMMARY OF THE INVENTION

Therefore, the present invention has been made in view of the above and other problems, and it is one object of the present invention to provide a method for controlling a printer using a portable terminal for mobile communication in a home network system that can control the printer serving as a local device not included in the home network system by means of the portable terminal for mobile communication serving as a home networking device.

It is another object of the present invention to provide a method for controlling a printer in a home network system using a portable terminal for mobile communication that can perform two-way communication rather than one-way communication, and that can receive, from the printer, a message indicating that selected content has been outputted, an output error message, etc. thereby improving the convenience for a user.

In accordance with one aspect of the present invention, the above and other objects can be accomplished by the provision of, in a home network system comprising a portable terminal for mobile communication and a PC (Personal Computer), a method for controlling a local printer connected to the PC using the portable terminal for mobile communication, comprising the steps of: (a) connecting the portable terminal for mobile communication to the PC by means of home networking; (b) searching for and selecting content within the PC using the portable terminal for mobile communication; (c) by the portable terminal for mobile communication, sending a print request message to the PC so that the local printer can print the selected content; (d) by the PC, creating a print job in response to the print request message and transferring the selected content to the local printer so that the local printer can print the transferred content; and (e) by the portable terminal for mobile communication, receiving a result of the print job from the local printer through the PC.

In accordance with another aspect of the present invention, the above and other objects can be accomplished by the provision of, in a home network system comprising a portable terminal for mobile communication and a PC (Personal Computer), a method for controlling a local printer connected to the PC using the portable terminal for mobile communication, comprising the steps of: (a) connecting the portable terminal for mobile communication to the PC by means of home networking; (b) searching for and selecting content within the PC using the portable terminal for mobile communication; (c) by the portable terminal for mobile communication, sending a print request message to the PC so that the local printer can print the selected content; (d) by the PC, creating a print job in response to the print request message and transferring the selected content to the local printer so that the local printer can print the transferred content; (e) by the portable terminal for mobile communication, sending a print cancellation request message to the PC while a printing operation is performed at the step (d); (f) by the PC, cancelling the print job of the local printer in response to the print cancellation request message; and (g) by the portable terminal for mobile communication, receiving a result of the print job cancellation from the local printer through the PC.

Here, the present invention exemplarily utilizes a home network system using UPnP (Universal Plug and Play) middleware, but is not limited to the home network system using UPnP middleware. An algorithm of the present invention can be applied to all home network systems using various home network middleware such as Jini, OSGi (Open Service Gateway Initiative) and HAVi (Home Audio/Video Interoperability).

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
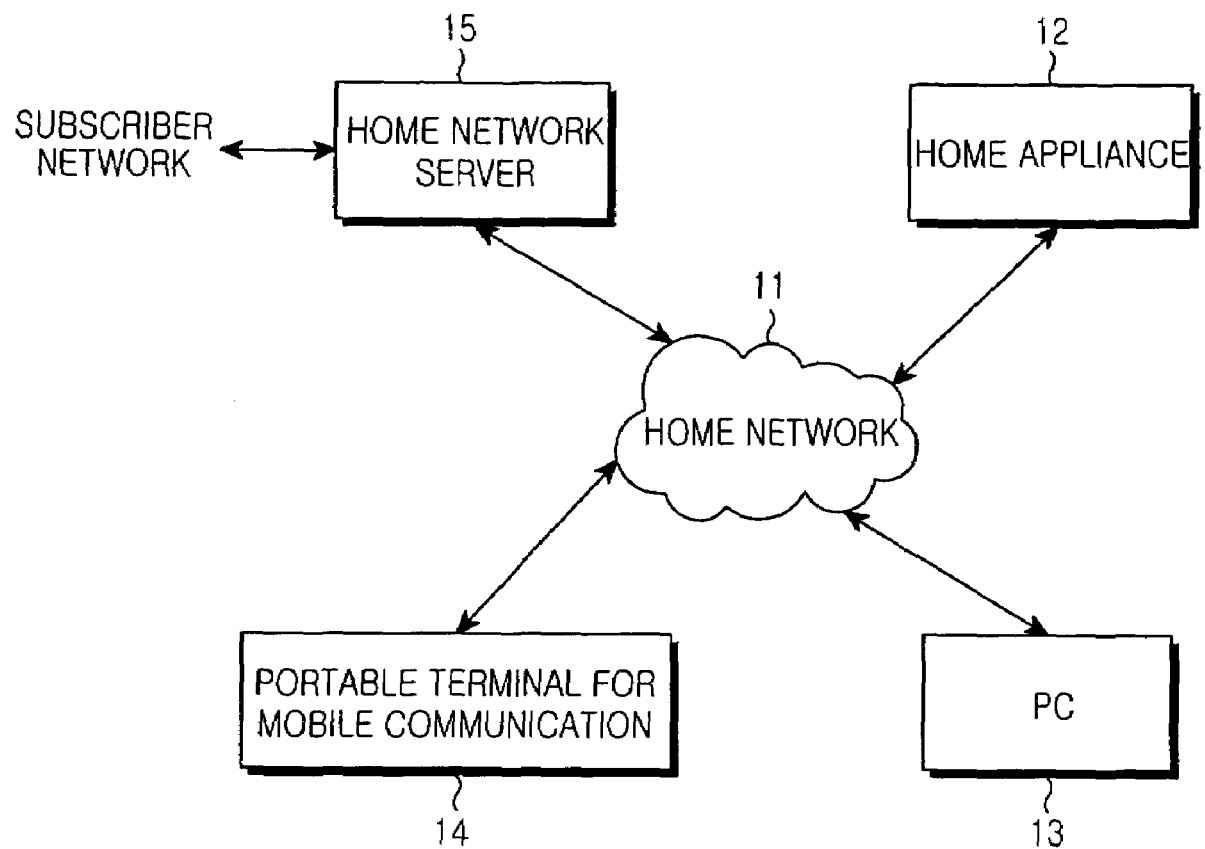
FIG. 1 is a block diagram illustrating an example of a home network system.

FIG. 1 is a block diagram illustrating an example of a home network system.

As shown in FIG. 1, the home network system comprises a home network 11 for supporting networking between devices in a home environment; at least one home appliance 12 serving as a client of the home network system; a PC (Personal Computer) 13; a portable terminal 14 for mobile communication; and a home network server 15 serving as a server in the home network 11 and connected to a subscriber network including a wired/wireless network.

The home network system constructed as described above supports home network middleware, such that a home application for a home service can perform communication without taking into account details about devices supporting the home network middleware, and each device can be connected to the home application for all services when supporting only the home network middleware.

Figure 2:
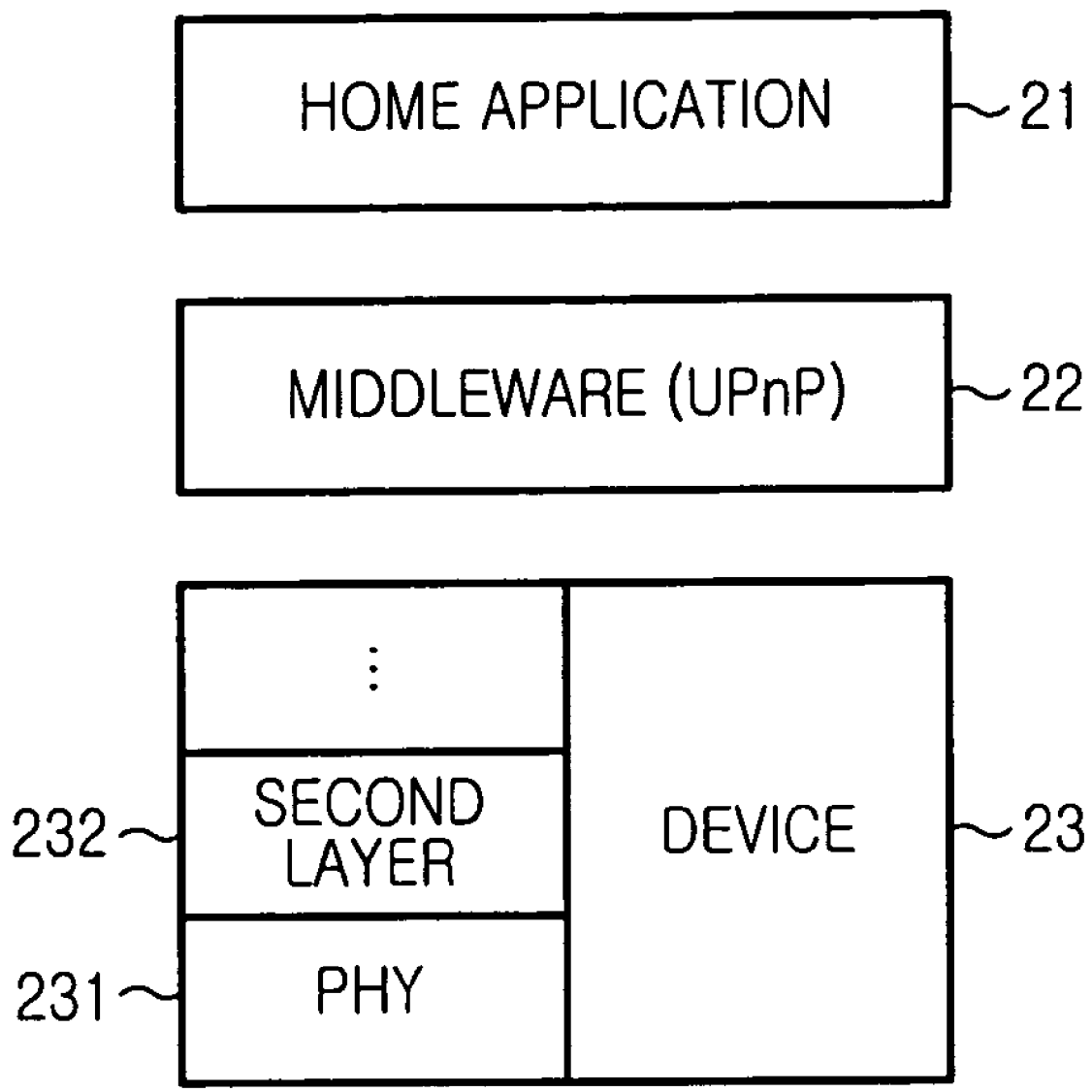
FIG. 2 is a block diagram illustrating a configuration of communication layers provided in the home network system of FIG. 1.

FIG. 2 is a block diagram illustrating a configuration of communication layers provided in the home network system of FIG. 1.

As shown in FIG. 2, the communication layers provided in the home network system are classified into a home application layer 21, a middleware layer 22, and a device layer 23.

The home application layer 21 is a layer for supporting application programs for the home service. The middleware layer 22 is a layer for supporting various types of home network middleware such as Jini, OSGi and HAVi. Here, the middleware layer 22 supports UPnP middleware. The device layer 23 is a layer for a physical connection including a PHY layer 231 serving as a lower layer of the OSI (Open Systems Interconnection) 7-layer model and a second layer 232.

All devices connected to the home network system include the home application layer 21, the middleware layer 22 and the device layer 23, respectively.

Figure 3:
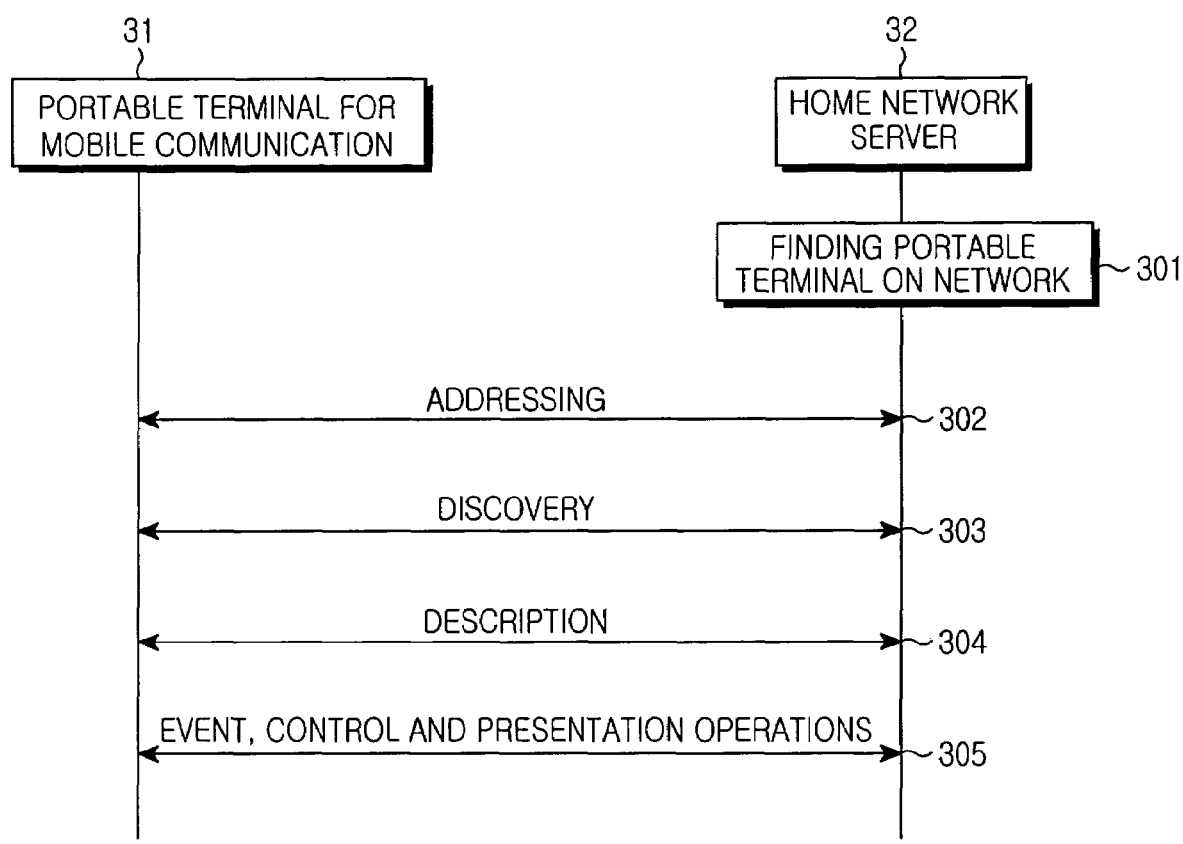
FIG. 3 is a signal flow chart illustrating a networking process of the home network system of FIGS. 1 and 2.

FIG. 3 is a signal flow chart illustrating a networking process of the home network system of FIGS. 1 and 2.

In the signal flow chart illustrating the networking process of the home network system shown in FIG. 3, a portable terminal 31 for mobile communication enters a home network, and a home network server 32 recognizes the fact that the portable terminal 31 has entered the home network to operate the portable terminal 31 as a home network client.

When the home network server 32 finds the portable terminal 31 for mobile communication on the home network (301), it assigns an address or performs an addressing operation (302). Then, the home network server 32 discovers at least one device to be controlled (303), confirms a description of the discovered device (304), and performs an operation associated with an event/control/presentation based on the confirmed description (305).

When UPnP, serving as exemplary middleware, supports an IP (Internet Protocol)-based network, the IP address assignment, that is, the addressing operation (302), is carried out initially because each device requires an IP address connected to the network.

When an IP address is assigned to each device through the addressing (302), at least one device to be controlled needs to be discovered. For this, a controller discovers the device using SSDP (Simple Service Discovery Protocol). At this point, the controller searches for at least one device of interest and a controlled device responds to the search of the controller. Then, when the controlled device connects to the network, it automatically and periodically notifies other devices of its own connection.

When the devices are discovered (303), a determination must be made as to a service to be performed by each device. For this, when the controller discovers the controlled device, the controlled device sends a URL (Uniform Resource Locator) associated with a description of the device, and the controller fetches the description configured by an XML (eXtensible Markup Language) document from the controlled device. This document includes manufacturer information, product information (including a model name, a serial number, etc), a service list, etc.

After fetching the description of the device and analyzing service information of the device, the controller controls the device by sending an appropriate action instruction to the device. At this point, the used protocol is XML/SOAP (Simple Object Access Protocol). This process is referred to as a "control" operation.

The state of the device frequently varies according to the peripheral environment of the home network. Because this variation may be important information to a user, UPnP defines events. The controller observes the state variation of the controlled device. When the state of the controlled device varies, the controlled device transfers an event message to the controller. Event information consists of a pair of an event name and an event value. The protocol used for the event is GENA (Generic Event Notification Architecture) protocol based on the XML format. This process is referred to as an "event" operation.

The controller can read an HTML (HyperText Markup Language) page of the controlled device. The HTML page displays a user interface relating to device use. The device is controlled and a control state is displayed, through the HTML page. This process is referred to as a "presentation" operation.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Figure 4:
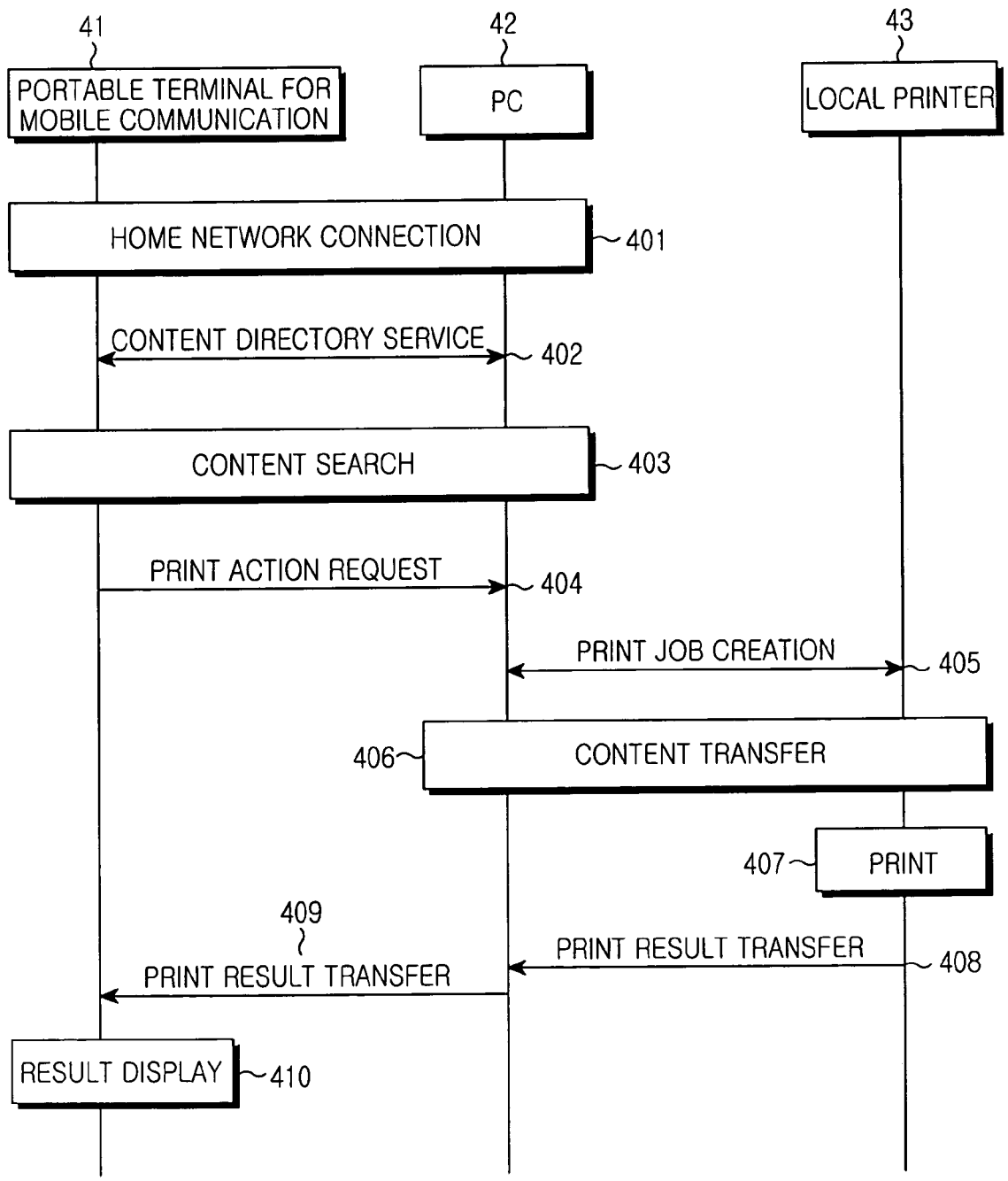
FIG. 4 is an operation flow chart illustrating one embodiment of a method for controlling a printer using a portable terminal for mobile communication in a home network system in accordance with the present invention.

FIG. 4 is an operation flow chart illustrating one embodiment of a method for controlling a printer using a portable terminal for mobile communication in a home network system in accordance with the present invention.

In the printer controlling method using the portable terminal for mobile communication in the home network system shown in FIG. 4, one precondition is that a home network connection must be established between a portable terminal 41 for mobile communication and a PC (Personal Computer) 42 (401). When the home network connection is established between the portable terminal 41 and the PC 42, information about local devices including a local printer 43 connected to the PC 42 and information indicating the presence of at least one available local device are transmitted.

A content directory service is provided between the portable terminal 41 and the PC 42 (402). Here, the content directory service enables a user to view at least one file and a list of content stored in the PC 42 displayed on a display unit of the portable terminal 41 (or a PDA (Personal Digital Assistant)) and to select desired content and an output function. Here, the content directory service is associated with a service operation in UPnP (Universal Plug and Play) middleware. Because one embodiment of the present invention is based on an example of UPnP, the content directory service of UPnP is described in relation to a search function. However, because the present invention is not limited to UPnP, the search function is not limited to the content directory service. That is, the present invention can be applied to all specific service operations in other home networking middleware.

The above-described content directory service provides a user interface based on a certain mechanism to display content stored in the PC 42 on the display unit of the portable terminal 41 for mobile communication. Furthermore, the content directory service provides at least one folder in a directory and at least one file stored in the folder, forms a logic directory layer by means of a structure based on detailed information associated with a file name, file extension and content size, maps the directory layer to content information stored in the PC 42 through action of a browser, and provides a result of the mapping to the user. Thus, desired content is searched for and selected using content search action provided from the browser (403).

The portable terminal 41 for mobile communication requests that the PC 42 control the local printer 43 by sending a print action request message for using the local printer 43 connected to the PC 42 (404).

In response to the print action request message from the portable terminal 41 for mobile communication, the PC 42 creates a print job for the local printer 43 (405). Print job creation means that the local printer 43 and the PC 42 exchange output information indicating, but not limited to, format, size, output class, number of pages, and two-side or one-side printing associated with content to be outputted.

To transfer selected content to the local printer 43, the PC 42 sets a protocol for local connection different from the protocol for the home network system and performs an out-of-band transfer through the set local connection protocol (406). The local printer 43 prints the transferred content (407), and performs the out-of-band transfer to send a result of the print job to the PC 42 (408). Then, the PC 42 transfers the print job result to the portable terminal 41 for mobile communication (409). Here, the print job result may include an error message (indicating a jam error, a transfer error, lack of paper, etc.) associated with a disabled print job such as a jam error message, as well as a print completion message.

When the portable terminal 41 for mobile communication receives a message indicating the print job result, it displays the print job result on the display unit (410). At this point, the print job result is displayed along with an audible alert, such as a beep sound, according to a setup operation.

Figure 5:
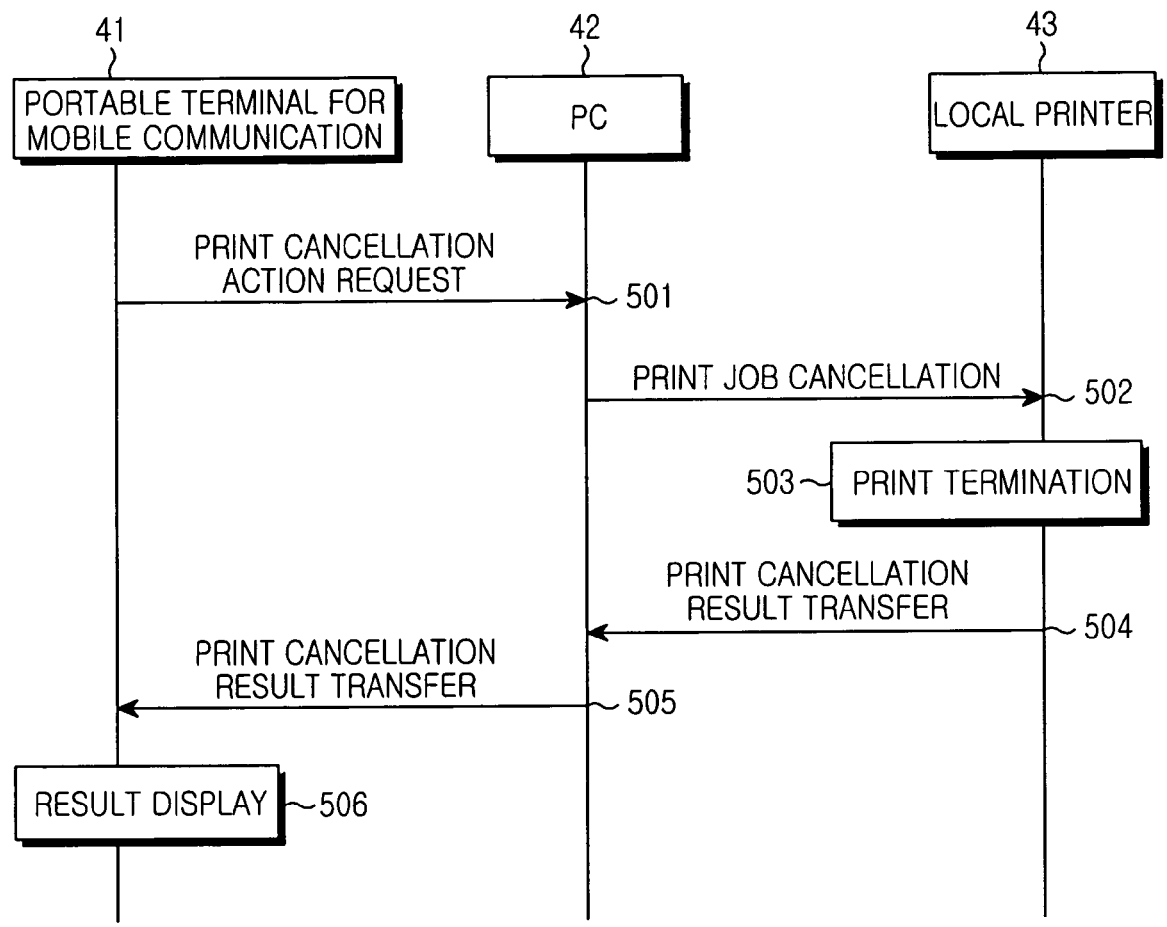
FIG. 5 is an operation flow chart illustrating one embodiment of a process for cancelling a print job in the method for controlling the printer using the portable terminal for mobile communication in the home network system in accordance with the present invention.

FIG. 5 is an operation flow chart illustrating one embodiment of a process for cancelling a print job in the method for controlling the printer using the portable terminal for mobile communication in the home network system in accordance with the present invention.

That is, FIG. 5 shows an operation in the case where the print job is cancelled using the portable terminal for mobile communication while the print job is performed using the portable terminal for mobile communication according to the flow chart shown in FIG. 4.

When a print job cancellation request is made after the print request is made through the above steps 401 to 404, the portable terminal 41 for mobile communication sends a print cancellation action request message to the PC 42 (501).

In response to the print cancellation action request message from the portable terminal 41 for mobile communication, the PC 42 cancels the print job of the local printer 43 (502).

The local printer 43 terminates the print job being currently performed (503). Here, print job termination means that the local printer 43 stops its output and resets information of a corresponding print job.

Then, the local printer 43 performs an out-of-band transfer to send a result of print job cancellation to the PC 42 through the local connection protocol (504). Then, the PC 42 transfers the result of print job cancellation to the portable terminal 41 for mobile communication (505). At this point, the result of print job cancellation is displayed on the display unit of the portable terminal 41 for mobile communication (506). Moreover, the result of print job cancellation is displayed along with a beep sound according to a setup operation.

Figure 6:
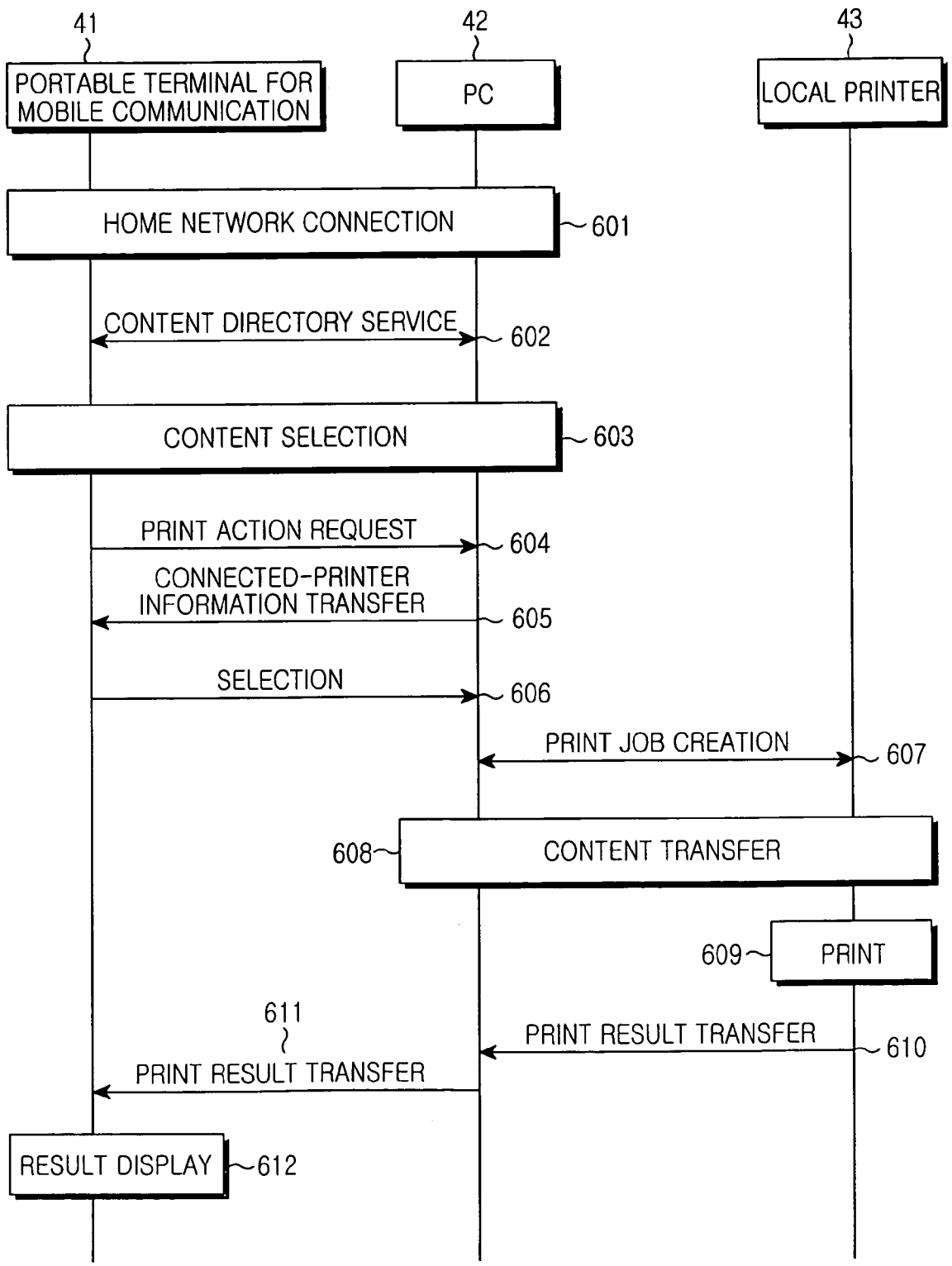
FIG. 6 is an operation flow chart illustrating another embodiment of the method for controlling the printer using the portable terminal for mobile communication in the home network system in accordance with the present invention.

FIG. 6 is an operation flow chart illustrating another embodiment of the method for controlling the printer using the portable terminal for mobile communication in the home network system in accordance with the present invention.

In the printer controlling method using the portable terminal for mobile communication in the home network system shown in FIG. 6, one precondition is that a home network connection must be established between a portable terminal 41 for mobile communication and a PC (Personal Computer) 42 (601). When the home network connection is established between the portable terminal 41 and the PC 42, information about local devices including a local printer 43 connected to the PC 42 or information indicating the presence of at least one available local device is not transmitted in the embodiment shown in FIG. 6 different from the embodiment shown in FIG. 4.

Then, a content directory service is provided between the portable terminal 41 and the PC 42 (602). Here, the content directory service enables a user to view at least one file and a list of content stored in the PC 42 displayed on a display unit of the portable terminal 41 (e.g., a PDA (Personal Digital Assistant)) and to select desired content and an output function.

The above-described content directory service provides a user interface based on a certain mechanism to display content stored in the PC 42 on the display unit of the portable terminal 41 for mobile communication. Furthermore, the content directory service provides at least one folder in a directory and at least one file stored in a folder, forms a logic directory layer by means of a structure based on detailed information associated with a file name, file extension and content size, maps the directory layer to content information stored in the PC 42 through action of a browser, and provides a result of the mapping to the user. Thus, desired content is searched for and selected using content search action provided from the browser (603).

The portable terminal 41 transfers, to the PC 42, a print action request message for using the local printer 43 connected to the PC 42 (604).

Then, the PC 42 transfers information of connected devices, including the local printer 43, to the portable terminal 41 for mobile communication (605). The portable terminal 41 selects a connected device, such as local printer 43 for performing a printing operation in response to the user's selection (606). User's selection is an operation for selecting a printer to perform the printing operation in the case where the PC 42 is connected to a plurality of local printers.

In response to the print action request message from the portable terminal 41 for mobile communication, the PC 42 creates a print job for the local printer 43 (607). Print job creation means that the local printer 43 and the PC 42 exchange output information indicating, but not limited to, format, size, output class, number of pages, and two-side or one-side printing associated with content to be outputted.

The PC 42 sets a protocol for a local connection different from the protocol for the home network system to transfer the selected content to the local printer 43 through the set local connection protocol (608). The local printer 43 prints the transferred content (609), and performs the out-of-band transfer to send a result of the print job to the PC 42 (610). Then, the PC 42 transfers the print job result to the portable terminal 41 for mobile communication (611). Here, the print job result may include an error message (indicating a jam error, a transfer error or lack of paper) associated with a disabled print job such as a jam error message, as well as a print completion message.

When the portable terminal 41 for mobile communication receives a message indicating the print job result, it displays the print job result on the display unit of portable terminal 41 (612). At this point, the print job result is displayed along with an audible alert, such as beep sound according to a setup operation.

As apparent from the above description, the present invention provides a method for controlling a printer using a portable terminal for mobile communication in a home network system, thereby controlling the printer serving as a local device not included in the home network system by means of the portable terminal for mobile communication serving as a home networking device.

The present invention can receive, from the printer, a message indicating that selected content has been outputted, an output error message, etc. through the portable terminal for mobile communication, thereby improving the convenience for a user.

The method of the present invention is implemented by a program that can be stored in a computer-readable storage medium (e.g., a CD-ROM (Compact Disk-Read Only Memory), RAM (Random Access Memory), floppy disk, hard disk, optical magnetic disk or etc.).

Although the preferred embodiments of the present invention have been disclosed for illustrative purposes, those skilled in the art will appreciate that various modifications, additions and substitutions are possible, without departing from the scope of the invention.

What is claimed is:

1. In a home network system comprising a portable terminal for mobile communication and a personal computer (PC), a method for controlling a local printer connected to the personal computer by using the portable terminal, comprising steps of:
    connecting the portable terminal to the personal computer by utilizing a home network;
    searching for and selecting content within the personal computer by using the portable terminal;
    sending a print request message from the portable terminal to the personal computer so that the local printer can print the selected content;
    creating a print job in the personal computer in response to the print request message and transferring the selected content to the local printer so that the local printer can print the transferred content; and
    receiving at the portable terminal, via the personal computer, a result of the print job from the local printer.

2. The method as set forth in claim 1, wherein the connecting step comprises receiving at the portable terminal, from the personal computer, information about the local printer connected to the personal computer.

3. The method as set forth in claim 1, further comprising steps of:
    after sending a print request message to the personal computer, transferring information about local devices connected to the personal computer to the portable terminal; and
    selecting, by the portable terminal, the local printer for the print job and providing the selection to the personal computer and then performing the step of creating the print job.

4. The method as set forth in claim 1, further comprising a step of displaying the received print job result on a display unit of the portable terminal.

5. The method as set forth in claim 4, further comprising a step of generating an audible alert when the print job result is displayed on the display unit of the portable terminal.

6. The method as set forth in claim 1, wherein the searching for and selecting content step comprises steps of:
- configuring at least one folder, at least one file stored in the folder, and information indicating a file name, file extension and content size in the form of a directory layer, and
- mapping the directory layer with information stored in the personal computer to provide a user with a result of the mapping through the display unit of the portable terminal so that the content stored in the personal computer may be displayed on a display unit of the portable terminal.

7. The method as set forth in claim 1, wherein the step of creating a print job and transferring the selected content to the local printer comprises steps of:
- creating, by the personal computer, the print job for the local printer in response to the print request message from the portable terminal;
- setting a local connection protocol for transferring the selected content, after creating the print job by the personal computer;
- transferring the selected content by utilizing the set local connection protocol; and
- printing, by the local printer, the transferred content.

8. The method as set forth in claim 1, wherein the print job result is a print completion message of the local printer.

9. The method as set forth in claim 1, wherein the print job result is a print error message of the local printer.

10. The method as set forth in claim 1, wherein the method is controlled by a program stored in a storage medium.

11. In a home network system comprising a portable terminal for mobile communication and a personal computer (PC), a method for controlling a local printer connected to the personal computer in response to the portable terminal, comprising steps of:
- connecting the portable terminal to the personal computer through a home network;
- searching for and selecting content within the personal computer in response to an input to the portable terminal;
- sending a print request message to the personal computer from the portable terminal so that the local printer can print the selected content;
- creating a print job in the personal computer in response to the print request message and transferring the selected content to the local printer to enable the local printer can print the transferred content;
- sending a print cancellation request message from the portable terminal to the personal computer during printing of the transferred content;
- canceling, by the personal computer, the print job of the local printer in response to the print cancellation request message; and
- receiving at the portable terminal a result of the print job cancellation from the local printer through the personal computer.

12. A storage medium in a home network system using middleware, the home networking system comprising a portable terminal for mobile communication and a personal computer (PC), the storage medium have a program stored therein for controlling a local printer connected to the personal computer in response to inputs from the portable terminal, the program comprising steps for:
- connecting the portable terminal and the personal computer together over a wireless home network;
- enabling a user to search for and select content within the personal computer by operating the portable terminal;
- receiving at the personal computer a print request message from the portable terminal;
- creating a print job in the personal computer in response to the print request message and transferring the selected content to the local printer so that the local printer can print the transferred content; and
- transmitting to the portable terminal, from the personal computer, a result of the print job performed by the local printer.

13. The storage medium as set forth in claim 12, wherein the program further comprises steps for:
- transferring information about local devices connected to the personal computer to the portable terminal upon receipt of the print request message by the personal computer; and
- allowing the local printer to be selected in response to an input into the portable terminal, wherein information pertaining to the selected local printer is provided to the personal computer prior to the step of creating the print job.

14. The storage medium as set forth in claim 12, wherein the step of creating a print job and transferring the selected content to the local printer comprises steps of:
- creating, by the personal computer, the print job for the local printer in response to the print request message from the portable terminal;
- setting a local connection protocol for transferring the selected content, after creating the print job by the personal computer;
- transferring the selected content by utilizing the set local connection protocol; and
- printing, by the local printer, the transferred content.

15. The storage medium as set forth in claim 12, wherein the program further comprises steps of:
- receiving at the personal computer, during printing of the transferred content, a print cancellation request message from the portable terminal;
- canceling, by the personal computer, the print job of the local printer in response to the print cancellation request message; and
- receiving at the portable terminal a result of the print job cancellation from the local printer through the personal computer.

* * * * *